United States Patent
Saint-Jacques et al.

(10) Patent No.: US 11,068,509 B2
(45) Date of Patent: Jul. 20, 2021

(54) A/B TESTING USING EGO NETWORK CLUSTERS

(71) Applicant: Microsoft Technology Licensing, LLC, Redmond, WA (US)

(72) Inventors: Guillaume B. Saint-Jacques, Santa Clara, CA (US); Jeremy John Simpson, Mountain View, CA (US); Maneesh Varshney, San Jose, CA (US); Ya Xu, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 16/146,750

(22) Filed: Sep. 28, 2018

(65) Prior Publication Data
US 2020/0104407 A1   Apr. 2, 2020

(51) Int. Cl.
*G06F 16/28*   (2019.01)
*G06Q 30/02*   (2012.01)
*G06F 16/951*   (2019.01)
*G06F 16/2453*   (2019.01)
*G06F 16/2455*   (2019.01)

(52) U.S. Cl.
CPC ...... *G06F 16/285* (2019.01); *G06F 16/24545* (2019.01); *G06F 16/24556* (2019.01); *G06F 16/951* (2019.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 8,676,799 | B1 * | 3/2014 | Vaver | G06K 9/6272 707/736 |
| 9,032,282 | B2 | 5/2015 | Kummer | |
| 9,842,092 | B1 | 12/2017 | Kim et al. | |
| 10,067,863 | B1 * | 9/2018 | Gandhi | G06F 11/3672 |
| 10,394,796 | B1 | 8/2019 | Dang et al. | |
| 10,534,851 | B1 | 1/2020 | Chan et al. | |
| 10,839,406 | B2 * | 11/2020 | Wang | G06F 16/9535 |
| 2009/0282343 | A1 | 11/2009 | Catlin et al. | |

(Continued)

OTHER PUBLICATIONS

"PageRank", Retrieved from: http://web.archive.org/web/20180511143556/https://en.wikipedia.org/wiki/PageRank, Retrieved Date: May 11, 2018, 20 Pages.

(Continued)

*Primary Examiner* — Son T Hoang
(74) *Attorney, Agent, or Firm* — Hickman Becker Bingham Ledesma LLP

(57) ABSTRACT

During operation, a system obtains a graph that includes a set of nodes representing users in an online network and a set of edges representing relationships or interactions between pairs of the nodes. Next, the system selects egos containing a subset of the users that are representative of a distribution of an attribute across the users. The system then generates clusters of users, such that each cluster contains an ego and alters selected from the ego's connections in the graph. The system further divides the clusters between a treatment group and a control group, exposes alters in the treatment group to a treatment variant of an A/B test, and exposes alters in the control group to a control variant of the A/B test. Finally, the system outputs a result of the A/B test.

20 Claims, 5 Drawing Sheets

(56) References Cited

U.S. PATENT DOCUMENTS

| | | |
|---|---|---|
| 2011/0161825 A1 | 6/2011 | Tierney et al. |
| 2011/0289207 A1* | 11/2011 | Liu ................... G06F 16/285 |
| 2012/0191691 A1 | 7/2012 | Hansen |
| 2013/0132437 A1 | 5/2013 | Park et al. |
| 2015/0106078 A1 | 4/2015 | Chang |
| 2015/0186521 A1 | 7/2015 | Yavilevich |
| 2016/0055261 A1* | 2/2016 | Reinhardt ........... G06F 16/9024 |
| | | 707/798 |
| 2016/0077672 A1* | 3/2016 | Anderson ............ G06F 40/197 |
| | | 715/234 |
| 2016/0103758 A1 | 4/2016 | Zhao et al. |
| 2016/0124839 A1 | 5/2016 | Mordo et al. |
| 2016/0253683 A1* | 9/2016 | Gui ................... G06Q 30/0203 |
| | | 705/7.32 |
| 2017/0344647 A1 | 11/2017 | Kenthapadi et al. |
| 2018/0253649 A1 | 9/2018 | Miikkulainen et al. |
| 2019/0034964 A1 | 1/2019 | Armbrust et al. |
| 2019/0057353 A1 | 2/2019 | Appikatala et al. |
| 2020/0005335 A1 | 1/2020 | Wang et al. |
| 2020/0065333 A1* | 2/2020 | Epasto ................ G06F 16/9024 |

OTHER PUBLICATIONS

"Non Final Office Action Issued in U.S. Appl. No. 16/022,291", dated Mar. 2, 2020, 38 Pages.

Chopra, Paras, "The Ultimate Guide to A/B Testing", Retrieved from: https://www.smashingmagazine.com/2010/06/the-ultimate-guide-to-a-b-testing/, Jun. 24, 2010, 14 Pages.

"Notice of Allowance Issued in U.S. Appl. No. 16/022,291", dated Sep. 2, 2020, 14 Pages.

Kohavi, et al., "Online Controlled Experiments and A/B Testing", In Book of Encyclopedia of Machine Learning and Data Mining, 2017, 8 Pages.

* cited by examiner

A/B TESTING USING EGO NETWORK CLUSTERS

BACKGROUND

Field

The disclosed embodiments relate to A/B testing. More specifically, the disclosed embodiments relate to techniques for performing A/B testing using ego network clusters.

Related Art

A/B testing, or controlled experimentation, is a standard way to evaluate user engagement or satisfaction with a new service, feature, or product. For example, a company may use an A/B test to show two versions of a web page, email, article, social media post, layout, design, and/or other information or content to users to determine if one version has a higher conversion rate than the other. If results from the A/B test show that a new treatment version performs better than an old control version by a certain amount, the test results may be considered statistically significant, and the new version may be used in subsequent communications with users already exposed to the treatment version and/or additional users.

A/B testing is typically conducted under the Stable Unit Treatment Value Assumption (SUTVA), which states that the behavior of each user in an A/B test depends only on the user's treatment and not on the treatment of other users in the A/B test. However, an online network setting typically exhibits network effect, in which a user's behavior is likely impacted by the behavior of the user's social neighborhood. For example, the user may find a new feature more valuable, and thus be more likely to adopt the new feature, if more of the user's connections in the online network adopt the new feature. Thus, if a treatment version in an A/B test has a significant impact on the user, the effect of the treatment version may spill over to the user's network circles, independently of whether the user's neighbors are in the treatment or control groups of the A/B test.

In turn, A/B testing of online networks that does not account for network effect may be biased and produce incorrect results. For example, an A/B test of an online network (e.g., a network A/B test) that operates under SUTVA may predict lift in click-through rate (CTR) from exposure of everyone in the online network to the treatment version to be significantly lower than the actual CTR lift caused by exposure to treatment because of spillover effects from the treatment group to the control group and/or from the control group to the treatment group. Moreover, failing to account for network effect in A/B testing results may lead to erroneous outcomes and business decisions.

Consequently, A/B testing of online networks may be facilitated by mechanisms for accounting for network effect during sampling of users and evaluation of A/B testing results.

BRIEF DESCRIPTION OF THE FIGURES

In the figures, like reference numerals refer to the same figure elements.

DETAILED DESCRIPTION

Figure 1:
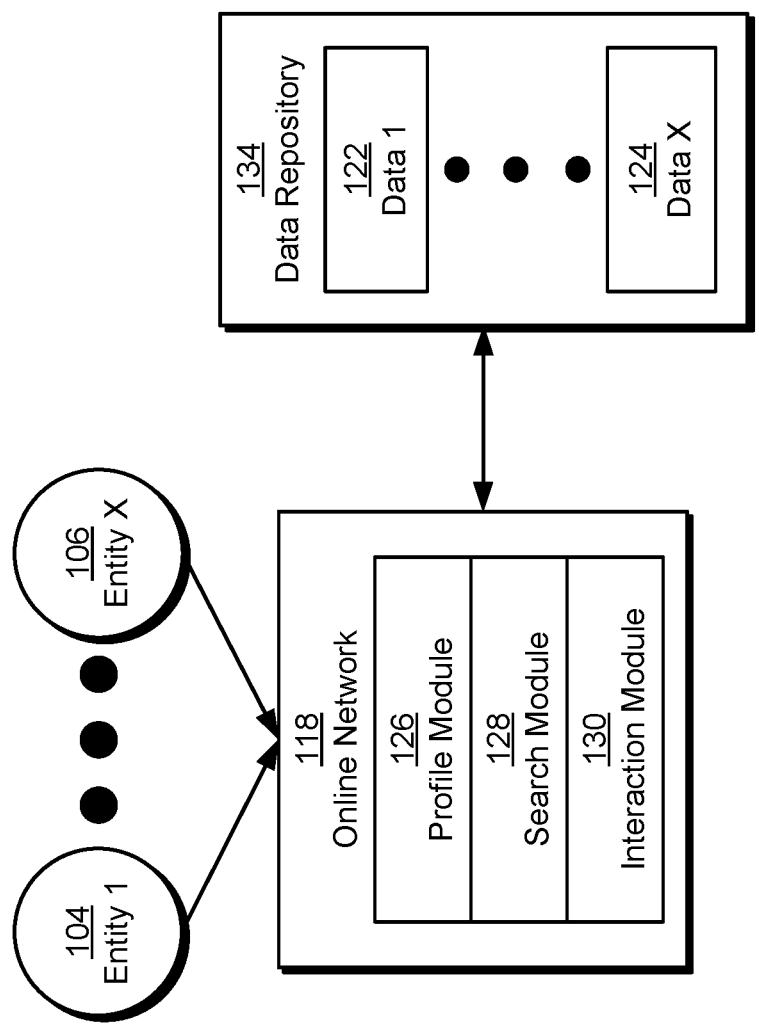
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for performing A/B testing. During an A/B test, one set of users may be assigned to a treatment group that is exposed to a treatment variant, and another set of users may be assigned to a control group that is exposed to a control variant. The users' responses to the exposed variants may then be monitored and used to determine if the treatment variant performs better than the control variant. On the other hand, the observed effect of a standard A/B test may be inaccurate in the presence of network effect, in which changes observed in the treatment group spill over to the control group due to interactions between the treatment and control groups.

To control for and/or detect network effect in a set of users, the disclosed embodiments may perform A/B testing using ego network clusters. First, a set of clusters is defined using a set of egos in a network of users, with the egos selected to contain users that are not connected to one another in the network. Each cluster is populated with one ego and with one or more alters of the ego, with the alters being selected from the ego's connections in the network. The alters may be assigned to the clusters to improve metrics associated with coherence and/or connection strength in the clusters, to improve the representativity of the egos with respect to the distribution of one or more attributes in the network, and/or to increase the isolation of the clusters from one another.

Next, the clusters are assigned to treatment and control groups in an A/B test. For example, the clusters may be randomly assigned to the treatment and control groups. In another example, pairs of clusters may be generated based on high similarity in attributes such as size, user engagement, and/or other metrics, and treatment and control assignments are made so that one cluster in each pair is assigned to the treatment group and the other cluster in the pair is assigned to the control group.

Alters in the clusters are then exposed to the variants associated with the corresponding assignments. For example, alters in the treatment group may be exposed to the treatment variant, and alters in the control group may be exposed to the control variant.

On the other hand, egos in the clusters may be exposed to variants in the A/B test independently of the assignments of the corresponding clusters to the treatment and control groups. For example, all egos may be exposed to either the treatment variant or the control variant. In another example, egos in the treatment group may be exposed to the treatment variant, and egos in the control group may be exposed to the control variant. In a third example, egos in the treatment group may be exposed to the control variant, and egos in the treatment group may be exposed to the treatment variant. In a fourth variant, egos in both the treatment group and the control group may be divided between the treatment and control variants.

Finally, a result of the A/B test is determined and outputted based on responses of the egos to the A/B test. For example, the result may be used to assess network effect in the online network when all egos are assigned to one variant in the A/B test. In another example, the result may be used to assess the overall effect of the A/B test when the egos are exposed to the same variants as the alters in the corresponding clusters. In a third example, the result may be used to characterize multiple effects in the A/B test when egos in the treatment and control groups are split between the treatment and control variants.

By performing A/B testing using ego network clusters that are substantially isolated from one another and/or representative of the distribution of one or more attributes in the network and analyzing outcomes using responses of egos in the clusters, the disclosed embodiments may accurately detect and/or control for network effect in A/B tests. In contrast, conventional techniques for addressing network effect in A/B testing may have insufficient power and/or erroneous A/B testing results because these techniques typically produce smaller numbers of clusters that reduce the power of A/B tests, clusters that are not sufficiently isolated from one another, and/or clusters that are not representative of the network. Consequently, the disclosed embodiments may improve the accuracy and performance of computer systems and technologies for performing A/B testing and/or improving user engagement and value in online networks.

A/B Testing Using Ego Network Clusters

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Figure 2:
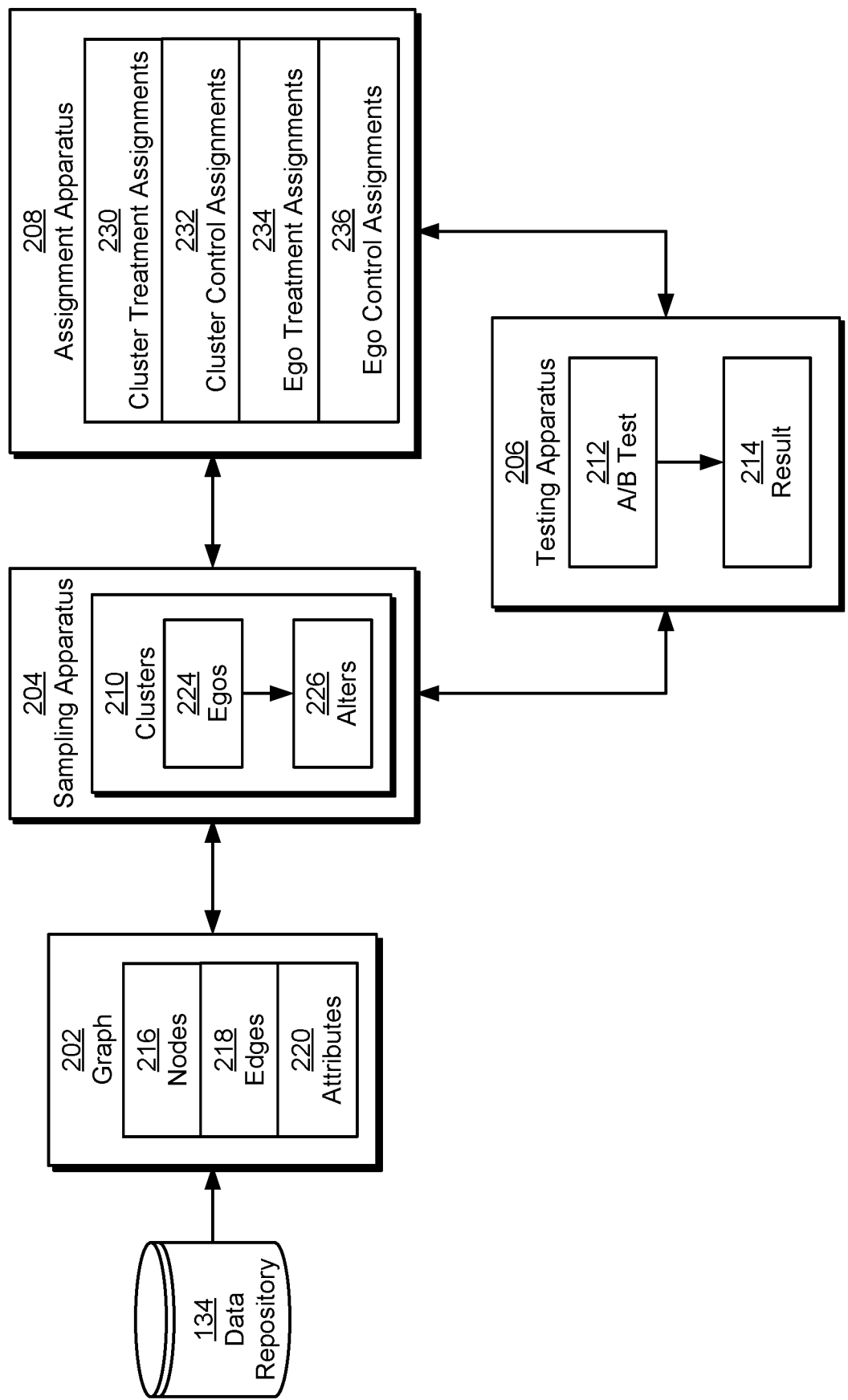
FIG. 2 shows a system for performing A/B testing using ego network clusters in accordance with the disclosed embodiments.

As shown in FIG. 2, data in data repository 134 may be used to form a graph 202 representing entities and the entities' relationships and/or activities in an online network, such as online network 118 of FIG. 1. Graph 202 may include a set of nodes 216, a set of edges 218, and a set of attributes 220.

Nodes 216 in graph 202 may represent entities in the online network. For example, the entities represented by nodes 216 may include individual members (e.g., users) of the online network, groups joined by the members, and/or organizations such as schools and companies. Nodes 216 may also represent other objects and/or data in the online professional network, such as industries, locations, posts, articles, multimedia, job listings, advertisements, and/or messages.

Edges 218 may represent relationships and/or interaction between pairs of nodes 216 in graph 202. For example, edges 218 may be directed and/or undirected edges that specify connections between pairs of members, education of members at schools, employment of members at organizations, business relationships and/or partnerships between organizations, and/or residence of members at locations. Edges 218 may also indicate actions taken by entities, such as creating or sharing articles or posts, sending messages, connection requests, joining groups, and/or following other entities.

Nodes 216 and edges 218 may contain attributes 220 that describe the corresponding entities, objects, associations, and/or relationships in the online network. For example, a node representing a member may include attributes 220 such as a name, username, industry, title, password, and/or email address. The node may also, or instead, include attributes 220 representing metrics such as the member's engagement with the online network, the number of messages sent or received by the member, and/or the number of connections the member has within the online network. In another example, an edge representing a connection between the member and another member may have attributes 220 such as a time at which the connection was made, the type of connection (e.g., friend, colleague, classmate, employee, following, etc.), and/or a strength of the connection (e.g., how well the members know one another).

In one or more embodiments, the system of FIG. 2 includes functionality to perform A/B testing of users in the online network. During an A/B test, the users may be exposed to treatment or control versions of a message or other content. For example, a random percentage of users may be selected for exposure to a new treatment version of an email, social media post, feature, offer, user flow, article, advertisement, layout, design, and/or other content during an A/B test. Other users in the online network may be exposed to an older control version of the content.

The users' responses to or interactions with the exposed versions may then be monitored. For example, users in the treatment group may be shown the treatment version of a feature after logging into the online network, and users in the control group may be shown the control version of the feature after logging into the online network. User responses to the control or treatment versions may be collected as clicks, conversions, purchases, comments, new connections, likes, shares, user sessions, and/or other metrics representing implicit or explicit user feedback from the users.

Those skilled in the art will appreciate that the online network may exhibit network effect, in which a user's behavior is impacted by the behavior of the user's social neighborhood. Thus, if a treatment version in an A/B test has a significant impact on the user, the effect of the treatment version may spill over to the user's neighbors in the online network, independently of whether the user's neighbors are in the treatment or control groups of the A/B test. For example, a treatment version of a "People You May Know" feature in a social networking website may make more relevant recommendations to the user and thus encourage the user to send more connection requests. However, users in the control group may receive the connection requests, visit the social networking website in response to the connection requests, and make their own connection requests while at the social networking website. If the metric of interest in the A/B test is the total number of connection requests made, a positive gain may be seen in both the treatment and control groups.

To detect or control for network effect during A/B testing, the system of FIG. 2 uses ego networks to assign treatment and control variants to clusters 210 of the users and evaluate A/B test results based on the responses of some or all of the users to the variants. First, a sampling apparatus 204 generates multiple clusters 210 of users based on nodes 216, edges 218, and/or attributes 220 in graph 202.

Clusters 210 include egos 224 representing a subset of users in the online network, as well as alters 226 representing additional users that are connected to egos 224 in the online network. For example, each cluster generated by sampling apparatus 204 may include one ego representing a focal node in graph 202, as well as a number of alters 226 that are connected to the node via a set of edges 218 in graph 202. Clusters 210 may also be generated to contain non-overlapping sets of users, so that egos 224 are not connected to one another in graph 202 and each alter is assigned to only one ego. In general, sampling apparatus 204 may produce clusters 210 in a way that allows for sufficient power in A/B testing, isolates clusters 210 from one another, improves representativity of egos 224, and/or increases the number of alters 226 in each cluster. Generating clusters from ego networks for use in A/B testing is described in further detail below with respect to FIG. 3.

Next, an assignment apparatus 208 generates assignments of egos 224, alters 226, and/or clusters 210 to the treatment and control groups of an A/B test 212. First, assignment apparatus 208 produces cluster treatment assignments 230 and cluster control assignments 232 for all clusters 210 generated by sampling apparatus 204. Cluster treatment assignments 230 may include assignments of a subset of clusters 210 to the treatment group, and cluster control assignments 232 may include assignments of a different subset of clusters 210 to the control group.

Cluster treatment assignments 230 and cluster control assignments 232 may be made in a number of ways. For example, assignment apparatus 208 may randomly assign clusters 210 to the treatment and control groups according to proportions specified in a configuration for A/B test 212. In another example, assignment apparatus 208 may generate pairs of clusters 210 that have high similarity in one or more attributes (e.g., attributes 220), such as cluster size, average user engagement, and/or other metrics. Assignment apparatus 208 may then assign one cluster in each pair to the control group and the other cluster in the same pair to the treatment group. In other words, assignment apparatus 208 may divide clusters 210 into the treatment and control groups so that both groups contain substantially the same distribution of the attribute(s) in the respective clusters 210.

Second, assignment apparatus 208 produces ego treatment assignments 234 and ego control assignments 236 for all egos 224. Ego treatment assignments 234 may include assignments of a subset of egos 224 to the treatment group, and ego control assignments 236 may include assignments of a different subset of egos 224 to the control group.

In one or more embodiments, assignment apparatus 208 makes ego treatment assignments 234 and ego control assignments 236 separately from cluster treatment assignments 230 and cluster control assignments 232. For example, assignment apparatus 208 may assign all egos 224 to either the treatment or control variant, regardless of the assignments of the corresponding clusters 210 to the treatment and control groups. In another example, assignment apparatus 208 may assign egos 224 to the same variant as the corresponding clusters 210. In a third example, assignment apparatus 208 may assign egos 224 to the opposite variant as the corresponding clusters 210. In a fourth example, assignment apparatus 208 may split one subset of egos 224 in clusters 210 assigned to the treatment group between the treatment and control variants and another subset of egos 224 in clusters 210 assigned to the control group between the treatment and control variants, resulting in four combinations of ego and cluster assignments (egos and corresponding clusters in treatment, egos and corresponding clusters in control, egos in treatment and corresponding clusters in control, egos in control and corresponding clusters in treatment).

Finally, a testing apparatus 206 performs A/B test 212 using cluster treatment assignments 230, cluster control assignments 232, ego treatment assignments 234, and ego control assignments 236. For example, testing apparatus 206 may monitor metrics such as click-through rates (CTRs), view rates, session length, number of sessions, log-in rates, job application rates, job search rates, and/or other metrics related to interaction with the treatment and control variants by the users.

Testing apparatus 206 may also determine a result 214 of A/B test 212 based on responses of egos 224 to A/B test 212. For example, testing apparatus 206 may apply a t-test to metrics collected from egos 224 in clusters 210 assigned to the treatment and control groups to determine if the distribution of responses of egos 224 in clusters 210 assigned to the treatment group is significantly different from the distribution of responses of egos 224 in clusters 210 assigned to the control group. In another example, testing apparatus 206 may use an instrumental variables model to estimate the effect of likes, comments, and/or other types of activity from alters 226 assigned to the treatment and control groups on the number of sessions egos 224 have with the online network.

When all egos 224 are assigned to the same variant, any difference in the distributions may be indicative of network effect in the online network. When egos 224 are assigned to the same variant as the corresponding clusters 210, differences in the distributions may be used to assess the total effect of the treatment variant on the users.

By performing A/B testing using ego network clusters that are substantially isolated from one another and/or representative of the distribution of one or more attributes in the network and analyzing A/B testing outcomes using responses of egos in the clusters, the system of FIG. 2 may accurately detect and/or control for network effect in A/B tests. In contrast, conventional techniques for addressing network effect in A/B testing may have insufficient power and/or erroneous A/B testing results because these techniques typically produce smaller numbers of clusters that reduce the power of A/B tests, clusters that are not sufficiently isolated from one another, and/or clusters that are not representative of the network. Consequently, the disclosed embodiments may improve the accuracy and performance of computer systems and technologies for performing A/B testing and/or improving user engagement and value in online networks.

Those skilled in the art will appreciate that the system of FIG. 2 may be implemented in a variety of ways. First, sampling apparatus 204, assignment apparatus 208, testing apparatus 206, and/or data repository 134 may be provided by a single physical machine, multiple computer systems, one or more virtual machines, a grid, one or more databases, one or more filesystems, and/or a cloud computing system. Sampling apparatus 204, assignment apparatus 208, and/or testing apparatus 206 may additionally be implemented together and/or separately by one or more hardware and/or software components and/or layers.

Second, the functionality of the system may be adapted to various types of online controlled experiments and/or hypothesis tests. For example, the system of FIG. 2 may be used to characterize network effects, overall effects, and/or other types of effects for different features and/or versions of websites, social networks, applications, platforms, advertisements, recommendations, and/or other hardware or software components that impact user experiences.

Figure 3:
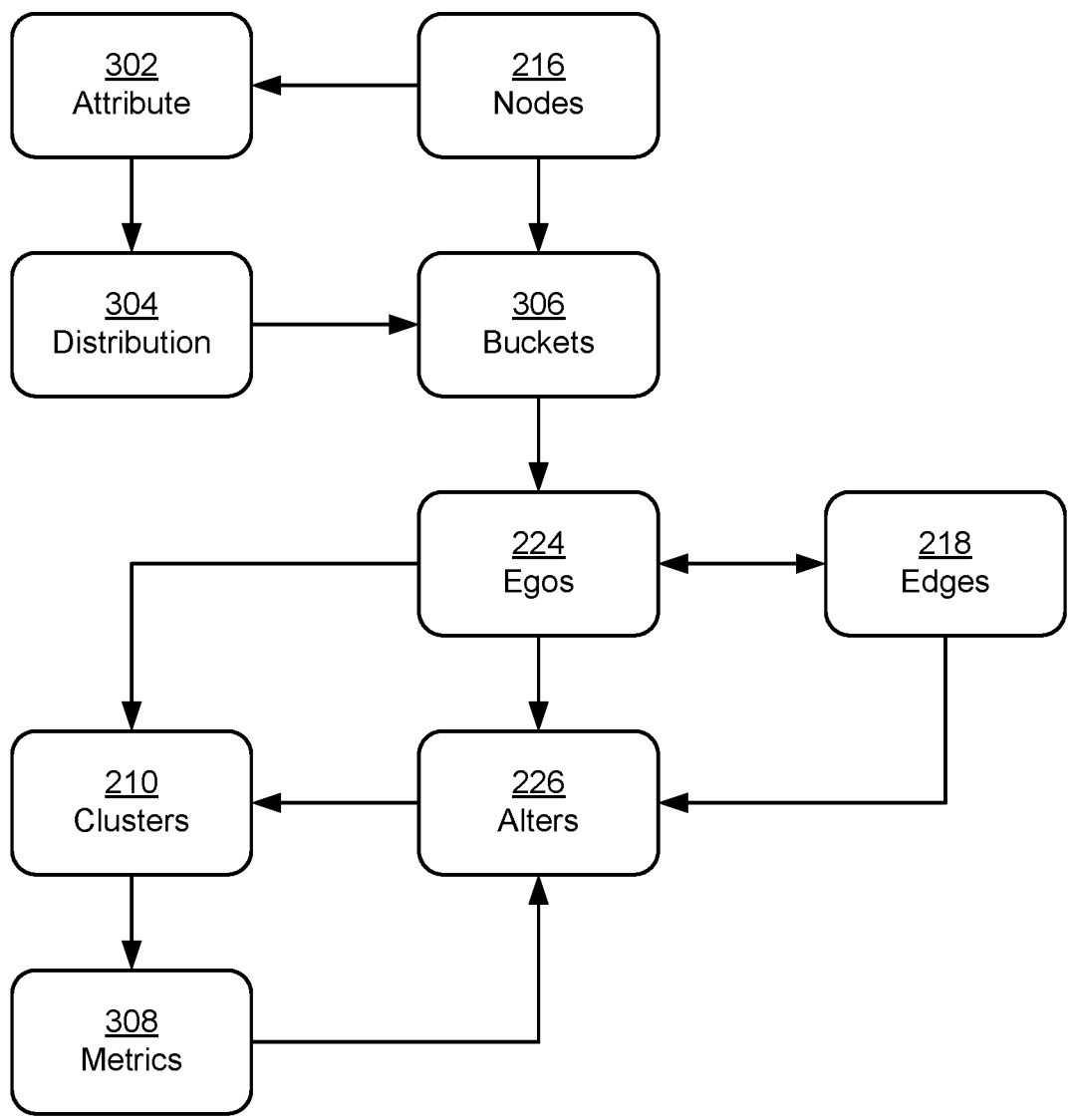
FIG. 3 shows the generation of ego network clusters for A/B testing in accordance with the disclosed embodiments.

FIG. 3 shows the generation of ego network clusters 210 for A/B testing in accordance with the disclosed embodiments. As mentioned above, clusters 210 may be formed from a graph (e.g., graph 202 of FIG. 2) of nodes 216 representing users (e.g., users in an online network or other type of community) and/or other entities and edges 218 representing relationships and/or interactions among the users and/or entities.

In particular, clusters 210 may be produced from ego networks that are identified using nodes 216 and edges 218. The ego networks include egos 224 representing focal nodes 216 and alters 226 that are connected to egos 224 via edges 218 in the graph. Egos 224 and alters 226 in clusters 210 may be selected to based on factors and/or criteria related to the number of clusters 210, size of clusters 210, isolation of clusters 210 from one another, coherence of clusters 210, and/or other attributes of clusters 210.

First, egos 224 may be selected to be representative of a distribution 304 of an attribute 302 across the population of users and/or entities in the community. For example, attribute 302 may include a user engagement with an online network and/or a platform (e.g., mobile platform, web platform, native platform, etc.) used to access the online network, a number of connections within the online network, an amount of interaction with the online network (e.g., number of messages, connection invitations, posts, shares, likes, comments, searches, etc.), and/or another value that represents the general population associated with nodes 216.

To select egos 224 in a way that is representative of distribution 302, nodes 216 may be grouped into equally sized buckets 306, with each bucket containing nodes with a range of values for attribute 302. For example, nodes 216 may be placed into buckets representing different ranges of connection counts of the corresponding users (e.g., 0-50 connections, 50-100 connections, 100-200 connections, 200-350 connections, 350-500 connections, 500+ connections, etc.). In addition, the buckets may be created and/or defined to collectively span all possible values of attribute 302 (e.g., all possible connection counts associated with nodes 216 in the graph), so that every node in the graph is placed into one bucket.

Next, egos 224 may be selected to contain equal numbers of users from buckets 306. For example, egos 224 may be randomly sampled from buckets 306 until a pre-specified number or proportion of nodes 216 is included in egos 224. In addition, the total number of egos 224 may be selected based on the number of nodes 216 and edges 218 in the graph, the structure of the graph, and/or the power of A/B tests that use clusters 210. For example, 100,000-200,000 egos 224 may be selected from a graph containing hundreds of millions of nodes 216 to allow for isolation of the corresponding clusters 210 from one another while providing more power to A/B tests than conventional clustering techniques that may generate on the order of 10,000 clusters from the same graph.

Egos 224 may further be selected as users that are not connected to one another via edges 218 in the graph. Such selection of egos 224 as non-connected users may be performed by randomly sampling candidates for egos 224 from a given bucket and iterating through the candidates in a randomly ordered list. During the iteration, a candidate is added to egos 224 when the candidate is not connected to existing egos 224 and excluded from egos 224 when the candidate is connected to one or more existing egos 224.

After a given ego is selected, some or all of the ego's connections may be included as alters 226 of the ego in the corresponding cluster. For example, connections of the ego may be added as the ego's alters 226 in the corresponding cluster until alters 226 contain a threshold proportion of the ego's connections (e.g., at least 80% of the ego's connections are alters 226 in the same cluster). Every alter may also be assigned to a single cluster to prevent overlap in membership among clusters 210 and/or improve the isolation of clusters 210 from one another.

Alters 226 may be assigned and/or reassigned to egos 224 to improve one or more metrics 308 associated with clusters 210. For example, each alter may be assigned to the cluster containing the ego with which the alter has the highest connection strength. In another example, an alter may be assigned to a cluster to increase the proportion of the corresponding ego's connections in the cluster. Alters 226 may continue to be assigned and/or reassigned to egos 224 and/or the corresponding clusters 210 until all connections of egos 224 are included in clusters 210 and one or more metrics 308 associated with creating clusters 210 (e.g., proportions of ego connections in each cluster, average strength of connections between each ego and the corresponding alters, etc.) meet the corresponding thresholds and/or are improved.

Finally, clusters 210 are outputted for use in one or more A/B tests. For example, each cluster may be outputted with a unique identifier for the clusters, one ego, and alters 226 assigned to the ego. In turn, the cluster may be assigned to a treatment or control group in an A/B test, and a result of the A/B test may be determined based on responses of egos 224 to the A/B test, as discussed above.

Figure 4:
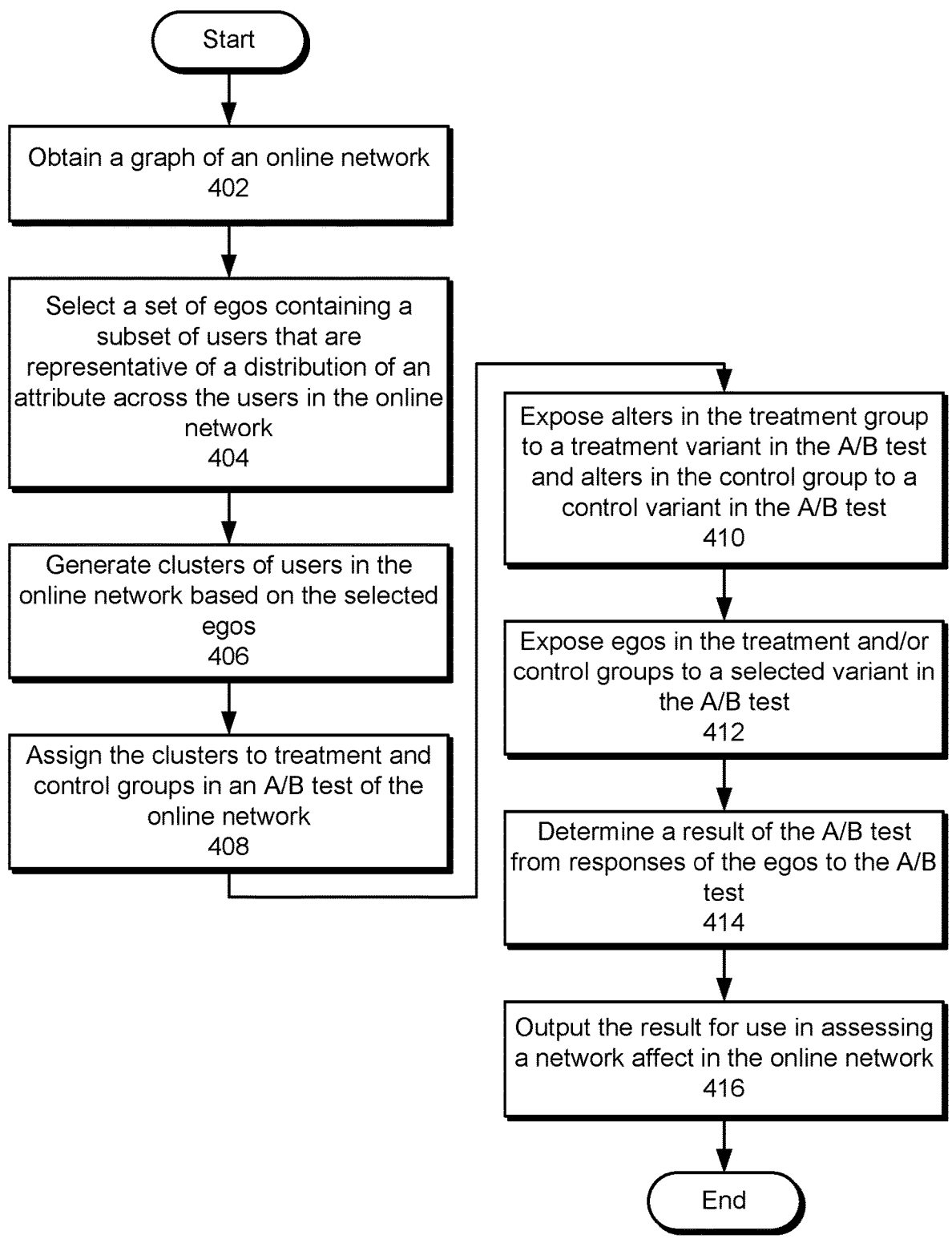
FIG. 4 shows a flowchart illustrating a process of performing A/B testing using ego network clusters in accordance with the disclosed embodiments.

FIG. 4 shows a flowchart illustrating a process of performing A/B testing using ego network clusters in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a graph of an online network is obtained (operation 402). The graph may include a set of nodes representing users in the online network, as well as a set of edges representing relationships between pairs of the users.

Next, a set of egos containing a subset of users that are representative of a distribution of an attribute across the users in the online network is selected (operation 404). For example, the users and/or nodes may be grouped into equally sized buckets that span different ranges of values for the attribute, and the egos may be selected as equal numbers of users from the buckets. In another example, the egos may be selected as users that are not connected to one another in the online network (e.g., based on edges in the graph). In a third example, a user may be excluded from the set of egos when a threshold proportion of connections of the user is already assigned to a cluster containing a different ego.

Next, clusters of users in the online network are generated based on the selected egos (operation 406). For example, each cluster may include an ego as a focal node and a set of alters selected from some or all connections of the ego. The alters may be assigned and/or reassigned to egos to improve metrics associated with the clusters, such as connection strengths between the ego and alters in each cluster and/or the proportion of the ego's connections that are present in the corresponding cluster. In other words, the clusters may be generated to increase isolation of the clusters from one another and/or improve the coherence and/or strength of connections between the ego and alters in each cluster.

The clusters are then assigned to treatment and control groups in an A/B test of the online network (operation 408). For example, the clusters may be randomly divided between the treatment and control groups. In another example, pairs of clusters may be generated to contain high similarity in attributes such as size, user engagement, and/or other metrics, and treatment and control assignments are made so that one cluster in each pair is assigned to the treatment group and the other cluster in the pair is assigned to the control group.

Alters in the treatment group are exposed to a treatment variant in the A/B test, and alters in the control group are exposed to a control variant in the A/B test (operation 410). For example, the alters in the treatment group may be exposed to a new "treatment" version of a message, feature, and/or other content item in the online network, and the alters in the control group may be exposed to an older, existing "control" version of the same message, feature, and/or content item.

On the other hand, egos in the treatment and/or control groups may be exposed to a selected variant in the A/B test (operation 412) that can be different from the variants to which the corresponding alters are exposed. For example, all egos may be exposed to a single variant in the A/B test, independently of the treatment and control assignments of the clusters to which the egos belong. In another example, egos in the treatment group may be exposed to the treatment variant, and egos in the control group may be exposed to the control variant. In a third example, egos in the treatment group may be exposed to the control variant, and egos in the treatment group may be exposed to the treatment variant. In a fourth variant, egos in the treatment group and the control group may be split between the treatment and control variants.

Finally, a result of the A/B test is determined from responses of the egos to the A/B test (operation 414) and outputted for use in assessing a network effect in the online network (operation 416). For example, the result may be generated by applying a hypothesis test to metrics collected from egos in the treatment and control groups to determine if differences in the metrics between the two groups of egos are statistically significant. If a statistically significant difference in metrics is detected between the two groups of egos, the network effect may be characterized based on the difference. In another example, a total effect of the treatment version on the online network may be assessed by analyzing differences in metrics collected from egos in the treatment group that have been exposed to the treatment version and egos in the control group that have been exposed to the control version. In a third example, multiple effects associated with the treatment and control versions may be determined by comparing metrics from egos in four different types of clusters: egos and alters that are assigned to treatment, egos and alters that are assigned to control, egos that are assigned to treatment and corresponding alters that are assigned to control, and egos that are assigned to control and corresponding alters that are assigned to treatment.

Figure 5:
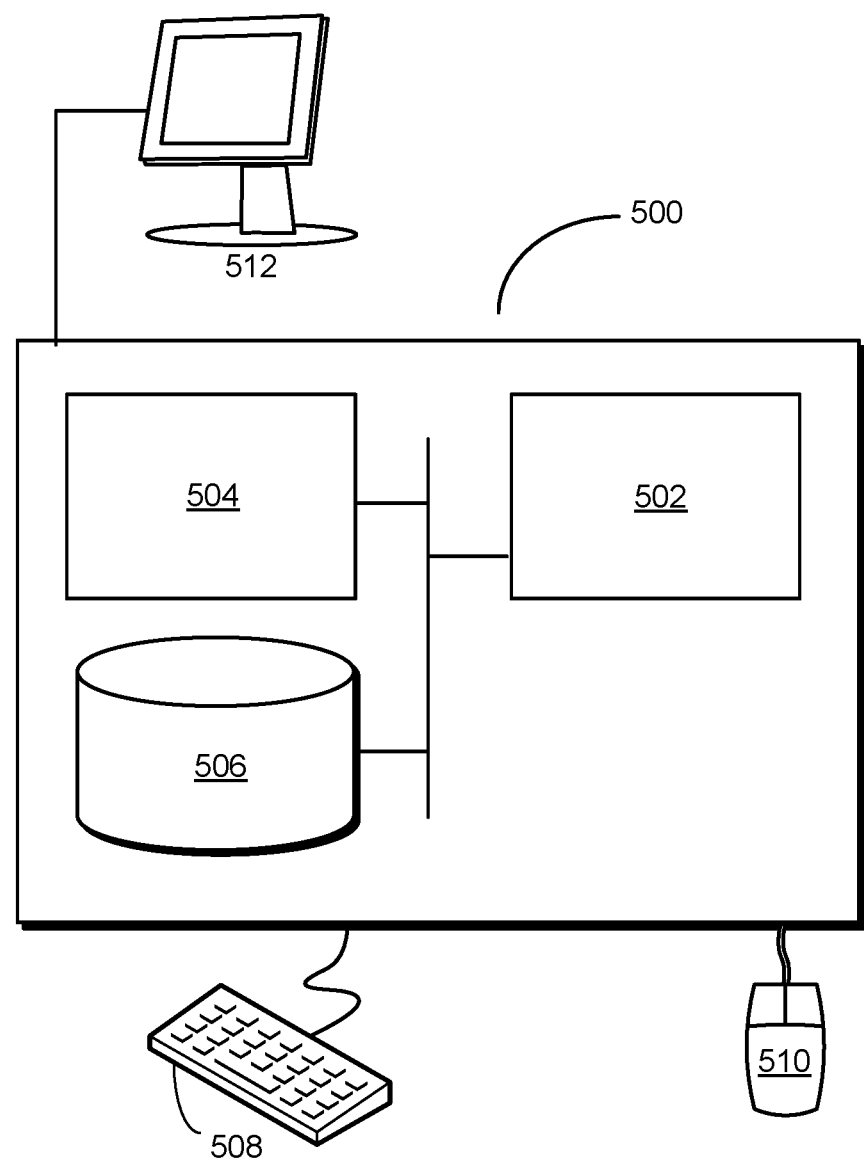
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the disclosed embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing A/B testing using ego network clusters. The system includes a sampling apparatus, assignment apparatus, and testing apparatus, one or more of which may alternatively be termed or implemented as a module, mechanism, or other type of system component. The sampling apparatus obtains a graph that includes a set of nodes representing users in an online network and a set of edges representing relationships or interactions between pairs of the nodes. Next, the sampling apparatus selects egos containing a subset of the users that are representative of a distribution of an attribute across the users and generates clusters of users, such that each cluster contains an ego and alters selected from the ego's connections in the graph. The assignment apparatus then divides the clusters between a treatment group and a control group. Finally, the testing apparatus exposes alters in the treatment group to a treatment variant of an A/B test, exposes alters in the control group to a control variant of the A/B test, and outputs a result of the A/B test.

In addition, one or more components of computer system 500 may be remotely located and connected to the other components over a network. Portions of the present embodiments (e.g., sampling apparatus, assignment apparatus, testing apparatus, data repository, online network, etc.) may also be located on different nodes of a distributed system that implements the embodiments. For example, the present embodiments may be implemented using a cloud computing system that performs A/B testing of remote users in an online network.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:
   obtaining a graph of an online network, wherein the graph comprises:
      a set of nodes representing a plurality of users in the online network;
      a set of edges representing relationships or interactions between pairs of the set of nodes; and
      a set of attributes representing description or metrics associated with the set of nodes or the set of edges;
   selecting, by a computer system, a set of egos comprising a subset of users that are representative of a distribution of an attribute across the plurality of users in the online network, wherein the distribution comprises a plurality of ranges of values for the attribute, and the set of egos is selected such that no ego in the set of egos is connected to any other ego in the set of egos;
   generating, by the computer system, clusters of users in the online network, wherein each cluster comprises an ego in the set of egos and alters selected from connections of the ego in the graph, wherein each of the alters represents an additional user connected to the ego;
   dividing, by the computer system, the clusters of users into a treatment group and a control group;
   exposing alters in the treatment group to a treatment variant of an A/B test and alters in the control group to a control variant of the A/B test, wherein each of the treatment variant and the control variant is a different version of an element of the A/B test; and
   outputting a result of the A/B test based on the exposing for use in assessing a network effect of the clusters of users, wherein the network effect connections associated with the respective user.

2. The method of claim 1, further comprising:
   determining the result of the A/B test based on responses of egos to the A/B test.

3. The method of dam 1, wherein the dividing the clusters into the treatment group and the control group comprises:
   generating pairs of the clusters that contain high similarity in an additional attribute; and
   assigning a first cluster in each of the pairs of clusters to a first subset of clusters and a second cluster in each of the pairs of clusters to a second subset of clusters.

4. The method of claim 1, wherein the selecting the set of egos comprises:
   grouping the plurality of users into equally sized buckets that span different ranges of values for the attribute; and
   selecting the set of egos to contain equal numbers of users from the equally sized buckets.

5. The method of claim 1, wherein the selecting the set of egos comprises:
   selecting the set of egos as users that are not connected to one another in the online network.

6. The method of claim 1, wherein the selecting the set of egos comprises:
excluding a user from the set of egos when a threshold proportion of connections of the user is already assigned to a cluster containing a different ego.

7. The method of claim 1, wherein the generating the clusters of users in the online network comprises:
assigning an alter to a cluster to improve a metric associated with the cluster.

8. The method of claim 7, wherein the metric comprises at least one of:
a connection strength between the alter and an ego in the cluster; or
a proportion of connections of the ego in the cluster.

9. The method of claim 1, further comprising:
during the A/B test of the online network, exposing the set of egos to a variant selected from the treatment variant and the control variant.

10. The method of claim 1, further comprising:
during the A/B test of the online network, exposing a first subset of egos in a first subset of clusters to the treatment variant and a second subset of egos in a second subset of clusters to the control variant.

11. The method of claim 1; further comprising:
during the A/B test of the online network, exposing a first subset of egos in a first subset of clusters to the control variant and a second subset of egos in a second subset of clusters to the treatment variant.

12. The method of claim 1, wherein the attribute comprises at least one of:
an engagement with the online network;
a number of connections in the online network; or
an amount of interaction with other users of the online network.

13. A system comprising:
one or more processors; and
memory storing instructions that, when executed by the one or more processors, cause the system to:
obtain a graph of an online network, wherein the graph comprises:
a set of nodes representing a plurality of users in the online network;
a set of edges representing relationships or interactions between pairs of the set of nodes; and
a set of attributes representing descriptions or metrics associated with the set of nodes or the set of edges;
select a set of egos comprising a subset of users that are representative of a distribution of an attribute across the plurality of users in the online network, wherein the distribution comprises a plurality of ranges of values for the attribute and the set of egos is selected such that no ego in the set of egos is connected to any other ego in the set of egos;
generate clusters of users in the online network, wherein each cluster comprises an ego in the set of egos and alters selected from connections of the ego in the graph, wherein each of the alters re resents an additional user connected to the ego;
divide the clusters of users into a treatment group and a control group;
expose alters in the treatment group to a treatment variant of an A/B test and alters in the control group to a control variant of the A/B test, wherein each of the treatment variant and the control variant is a different version of an element of the A/B test; and
output a result of the A/B test based on the exposing for use in assessing a network effect of the clusters of users, wherein the network effect refers to an impact on online behaviors of a respective user by online behaviors of connections associated with the respective user.

14. The system of claim 13, wherein the memory further stores instructions that, when executed by the one or more processors, cause the system to:
determine the result of the A/B test based on responses of egos to the A/B test.

15. The system of claim 13, wherein the selecting the set of egos comprises:
grouping the plurality of users into equally sized buckets that span different ranges of values for the attribute; and
selecting the set of egos to contain equal numbers of users from the equally sized buckets.

16. The system of claim 13, wherein the selecting the set of egos comprises at least one of:
selecting the set of egos as users that are not connected to one another in the online network; or
excluding a user from the set of egos when a threshold proportion of connections of the user has already been assigned to a cluster containing a different ego.

17. The system of claim 13, wherein the generating the clusters of users in the online network comprises:
assigning an alter to a cluster to improve a metric associated with the cluster.

18. The system of claim 17, wherein the metric comprises at least one of:
a connection strength between the alter and an ego in the cluster; or
a proportion of connections of the ego in the cluster.

19. The system of claim 13, wherein the memory further stores instructions that, when executed by the one or more processors, cause the system to:
during the A/B test of the online network, expose the set of egos to a variant selected from the treatment variant and the control variant.

20. A non-transitory computer-readable storage medium storing instructions that when executed by a computer cause the computer to perform a method, the method comprising:
obtaining a graph of an online network, wherein the graph comprises:
a set of nodes representing a plurality of users in the online network;
a set of edges representing relationships or interactions between pairs of the set of nodes; and
a set of attributes representing descriptions or metrics associated with the set of nodes or the set of edges;
selecting a set of egos comprising a subset of users that are representative of a distribution of an attribute across the plurality of users in the online attribute, and the set of egos is selected such that no ego in the set of egos is connected to any other ego in the set of egos;
generating clusters of users in the online network, wherein each cluster comprises an ego in the set of egos and alters selected from connections of the ego in the graph, wherein each of the alters represents an additional user connected to the ego;
dividing the clusters into a treatment group and a control group;
exposing alters in the treatment group to a treatment variant of an A/B test and alters in the control group to a control variant of the A/B test, wherein each of the treatment variant and the control variant is a different version of an element of the A/B test; and outputting a result of the A/B test based on the exposing for use in assessing a network effect of the clusters of users, wherein the network effect refers to an impact on online behaviors of a respective user by online behaviors of connections associated with the respective user.

* * * * *